US009900406B1

United States Patent
Hanks et al.

(10) Patent No.: US 9,900,406 B1
(45) Date of Patent: Feb. 20, 2018

(54) METHOD AND APPARATUS FOR DEMAND-BASED CABLE UPSTREAM CHANNEL ASSIGNMENT

(75) Inventors: William Turner Hanks, Carol Stream, IL (US); Jeffrey Joseph Howe, West Chicago, IL (US)

(73) Assignee: ARRIS Enterprises LLC, Suwanee, GA (US)

(*) Notice: Subject to any disclaimer, the term of this patent is extended or adjusted under 35 U.S.C. 154(b) by 1502 days.

(21) Appl. No.: 13/019,749

(22) Filed: Feb. 2, 2011

Related U.S. Application Data (60) Provisional application No. 61/300,694, filed on Feb. 2, 2010.

(51) Int. Cl.
*H04J 3/22* (2006.01)
*H04L 29/06* (2006.01)

(52) U.S. Cl.
CPC .................................... *H04L 69/08* (2013.01)

(58) Field of Classification Search
CPC .............. H04L 12/2801; H04L 12/287; H04L 12/2861; H04L 69/08; H04L 27/3405; H04L 27/2601; H04L 20/78; H04N 7/17309; H04N 21/615; H04N 21/2221; H04N 7/22; H04N 7/10; H04N 21/6118
See application file for complete search history.

(56) References Cited

U.S. PATENT DOCUMENTS

| | | | |
|---|---|---|---|
| 2006/0126660 A1* | 6/2006 | Denney | H04J 3/1694 370/468 |
| 2010/0020648 A1* | 1/2010 | La Rosa | G11C 27/005 368/107 |
| 2010/0020684 A1* | 1/2010 | Balakrishnan | H04L 5/023 370/230 |
| 2010/0022186 A1* | 1/2010 | Walley | 455/12.1 |
| 2011/0035772 A1* | 2/2011 | Ramsdell | H04H 20/103 725/36 |
| 2011/0185263 A1* | 7/2011 | Chapman | H04L 12/2801 714/776 |
| 2012/0128045 A1* | 5/2012 | Ling | H04L 12/2801 375/222 |
| 2012/0300697 A1* | 11/2012 | Agarwal | 370/326 |

* cited by examiner

Primary Examiner — Jung-Jen Liu
(74) Attorney, Agent, or Firm — Bart A. Perkins (57) ABSTRACT

Methods, systems, and apparatuses can provide improved bandwidth and reduction in processing resources in a cable system using bonded upstream channels. Physical or environmental changes can occur in the HFC network effecting communication performance on one or more upstream channels. For optimal HFC network performance periodic measurements and adjustments are made reducing HFC network bandwidth and consume processing resources. This periodic maintenance is performed even if the communication service is not using the additional upstream bandwidth provided through upstream channel bonding. Demand-based bonded upstream channel allocation and de-allocation provides additional upstream bandwidth when required while optimizing HFC network performance and reducing processing resources through the reduction of periodic measurements and adjustments on the HFC network.

6 Claims, 9 Drawing Sheets

METHOD AND APPARATUS FOR DEMAND-BASED CABLE UPSTREAM CHANNEL ASSIGNMENT

RELATED APPLICATIONS

This application is a non-provisional application claiming the benefit of U.S. Provisional Application Ser. No. 61/300,694, entitled "Method and Apparatus For Demand-Based Cable Upstream Channel Assignment," filed Feb. 2, 2010, which is hereby incorporated by reference in its entirety.

TECHNICAL FIELD

This disclosure relates to improving bandwidth and processing resources in a cable system capable of using multiple bonded upstream RF channels.

BACKGROUND

The Data-Over-Cable Service Interface Specification (DOCSIS) was established by cable television network operators to facilitate transporting data traffic, primarily Internet traffic, over existing community antenna television (CATV) networks. In addition to transporting data traffic, as well as television content signals over a CATV network, multiple services operators (MSO) also use their CATV network infrastructure for carrying voice, video on demand (VoD) and video conferencing traffic signals, among other types.

In transporting downstream multimedia content, as well as data, upstream messages are typically sent to request the content and to set up a service flow to deliver the content. In addition to downstream multimedia content, such as video, voice traffic also uses message signaling to set up service flows for the upstream and downstream directions.

These signals are typically sent over a fiber network to a location, sometimes referred to as a node, near an end user, and from the node to a broadband user device via a coaxial cable. Such an arrangement is known in the art as a hybrid fiber coax network (HFC).

Typically, when a device is initially connected to the network, the device goes through an initialization process. The initialization process can include scanning the channels to identify downstream channels driven by a headend. Once a downstream channel is identified, the device performs ranging for each upstream channel that it has been configured for and registration processes to join the HFC network. During the course of normal operation each CPE device performs station maintenance upon periodic request from the headend.

BRIEF DESCRIPTION OF THE DRAWINGS

Like reference numbers and designations in the various drawings indicate like elements.

DETAILED DESCRIPTION

In some implementations of this disclosure, systems and methods can operate to use more than one upstream channel that are bonded to increase upstream bandwidth of a CPE device. Channel bonding can be used to increase the upstream bandwidth that is available to a CPE device since one or more upstream channels can be used to provide communication services. Periodic maintenance is performed on each upstream channel and can include measuring and/or adjusting power level, transmit timing, pre-equalization coefficients and transmit frequency, among others. Periodic maintenance is performed by the CMTS on a CPE device capable and provisioned for communication services on one or more upstream channels even though the CPE device at a given point in time does not have the requirement for, nor is using the additional bonded upstream channels. Thereby, downstream and upstream bandwidth as well as the associated processing resources of the CPE device and CMTS can be optimized through demand-based bonded upstream channel assignment. For example, a CPE device initially configured for transmission on one or more bonded upstream channels can be instructed by the CMTS to use a subset of the provisioned upstream channels. The CMTS can then monitor the CPE device upstream bandwidth requests and allocate additional bonded upstream channels as needed. As upstream bandwidth from the CPE device decreases the CMTS can de-allocate bonded upstream channels.

Figure 1:
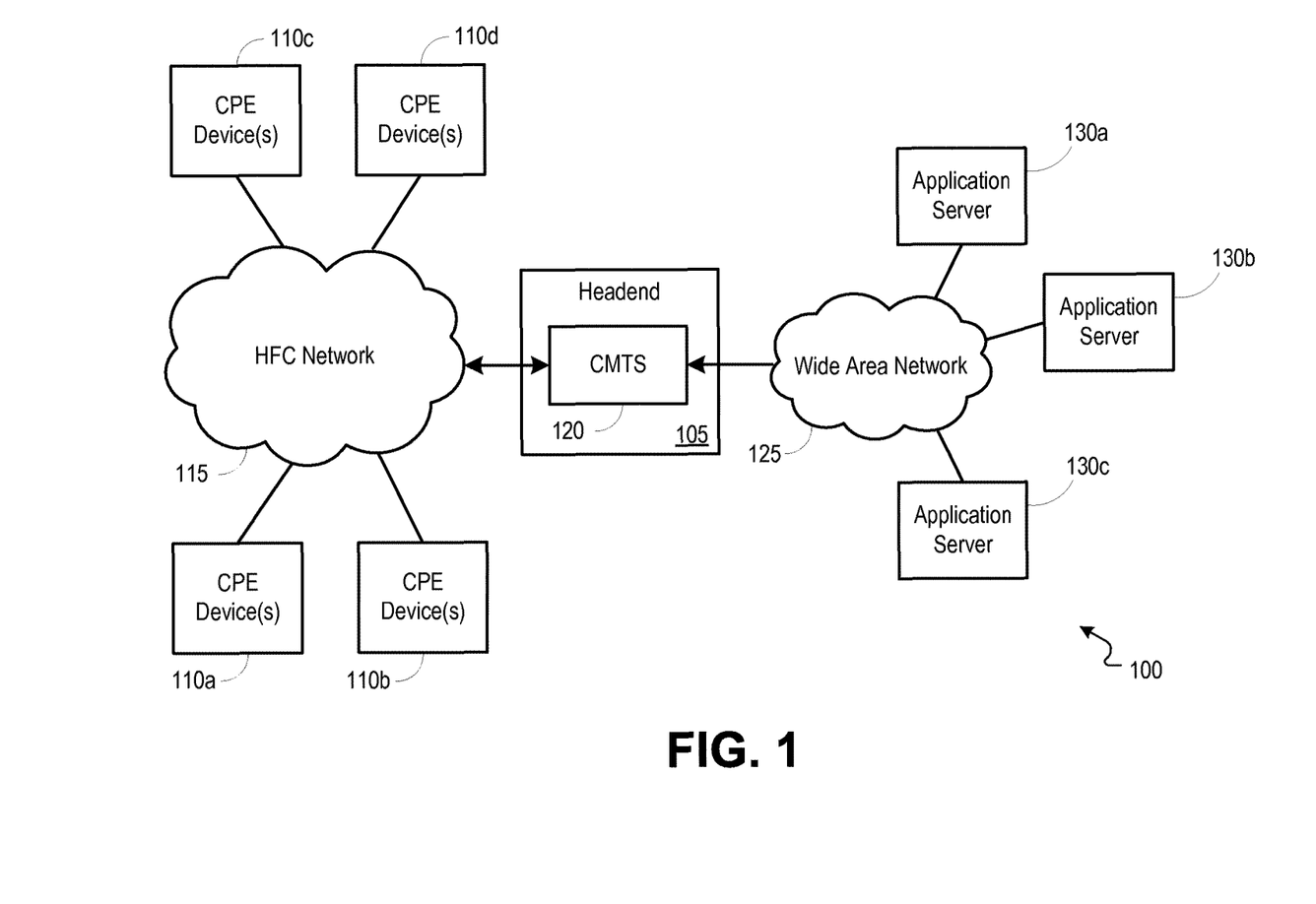
FIG. 1 is a block diagram illustrating an exemplary network environment operable to provide bonded upstream channel operation on one or more channels.

FIG. 1 is a block diagram illustrating an exemplary network environment operable to provide bonded upstream channel communication on more than one upstream channel. In some implementations, a headend 105 can provide video, data and/or voice service(s) to CPE devices 110a-d in one or more subscriber groups (e.g., service group(s)) through a hybrid fiber-coax (HFC) network 115. The headend 105 can include devices such as a cable modem termination system (CMTS) 120 and/or an edge quadrature amplitude modulation (EQAM) device, or a combined device including multiple edge and/or video or data processing functionalities. Such devices can operate to facilitate communications between application servers 130a-c on wide area network 125 and the CPE devices 110a-d. In various implementations, the network 125 can include one or more networks internal to the headend and/or one or more networks external to the headend (e.g., one or more extranets, the Internet, etc.).

Data services can be handled by the headend 105 through a CMTS 120. The CMTS 120 can receive data signals from application servers 130a-c or nodes through wide area network(s) 125. The wide area network(s) 125, for example, can operate using Internet protocol (IP), sending data packets to and receiving data packets from the headend 105. In some examples, the CMTS 120 can be paired with a SIP proxy server (not shown) operable to provide voice over internet protocol (VoIP) services with voice connectivity to other subscribers or voice connectivity to a public switched telephone network (PSTN) (not shown). In still further examples, one or more video sources (not shown) may provide streaming data through the wide area network(s) 125 to the CMTS 120

In some implementations, the CMTS 120 can forward packets destined for subscribers to an EQAM device used to modulate the signal onto a carrier waveform. The carrier waveform can include both data and video streams, in both multicast and unicast (e.g., point-to-point) formats for transmission to a combiner, which can combine multiple signals onto a single fiber for transmission to one or more CPE devices 110a-d via the hybrid fiber-coax (HFC) network 115. In other implementations, the CMTS 120 can modulate a baseband signal to a carrier wave and transmit the signal to a combiner for upconversion to a transmission frequency.

Figure 2:
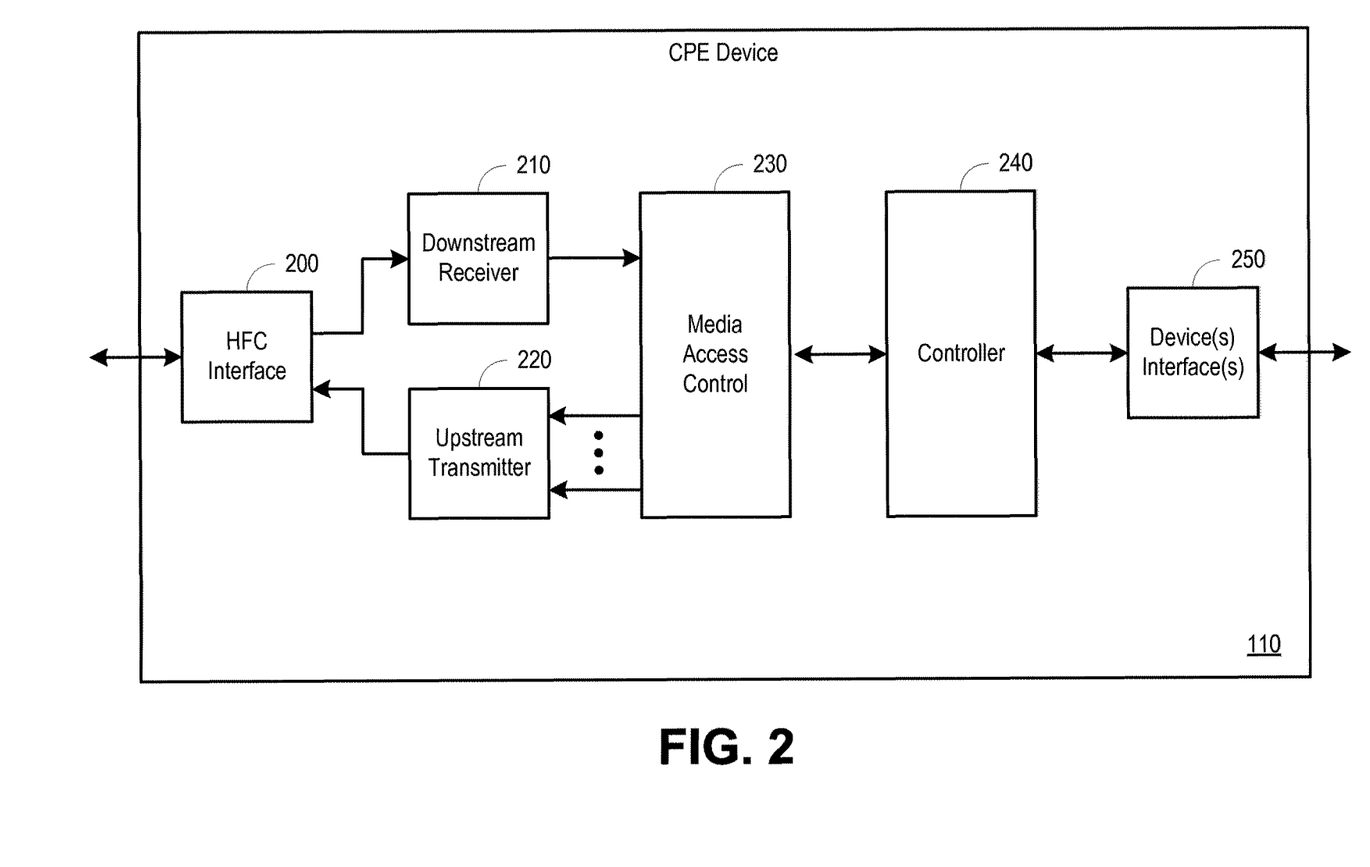
FIG. 2 is a block diagram of a CPE device capable of transmitting data on one or more bonded upstream channels.

FIG. 2 is a block diagram illustrating a CPE device 110 with one or more bonded upstream channels. The device 110 can include an HFC network interface 200. The HFC network interface can facilitate receipt and transmission of communications via the HFC network. Downstream signals can be received from a headend CMTS via the HFC network, and upstream signals can be sent to the headend CMTS via the HFC network.

The CPE device 110 can also include a downstream receiver 210 and upstream transmitter 220. The downstream receiver 210 can include a tuner(s), demodulator(s), analog to digital convertor(s) and analog signal conditioning circuitry. The downstream receiver 210 provides the media access controller (MAC) module 230 and controller 240 with packets from a downstream channel. Elements of the downstream receiver 210 can be integrated into MAC module 230. The downstream receiver 210 can be capable of providing packets from multiple bonded downstream channels. The MAC module 230 can provide bandwidth allocation as controlled by the CMTS for downstream/upstream channel(s), initiation of upstream channel(s) requests, transmissions of packets on one or more bonded upstream channels, quality of service (QoS), and maintenance capabilities. The controller 240 can provide packet processing and control of the HFC interface 200, downstream receiver 210, MAC module 230, upstream transmitter 220 and the device interface(s) 250. The associated processing and control of CPE device 110 can be distributed between the MAC module 230 and the controller 240. The device interface(s) 250 can provide interconnect to external devices such as a personal computer (PC) and can include industry standard ethernet, wireless and universal serial bus (USB) interfaces, among many others. The device interface(s) 250 can be integrated in controller 240. The upstream transmitter 220 is capable of sending upstream packets from MAC module 230 on one or more bonded upstream channels. The upstream transmitter 220 can include modulator(s), digital to analog convertor(s) and analog circuitry. Some elements of the upstream receiver 220 can be integrated into MAC module 230.

Figure 3:
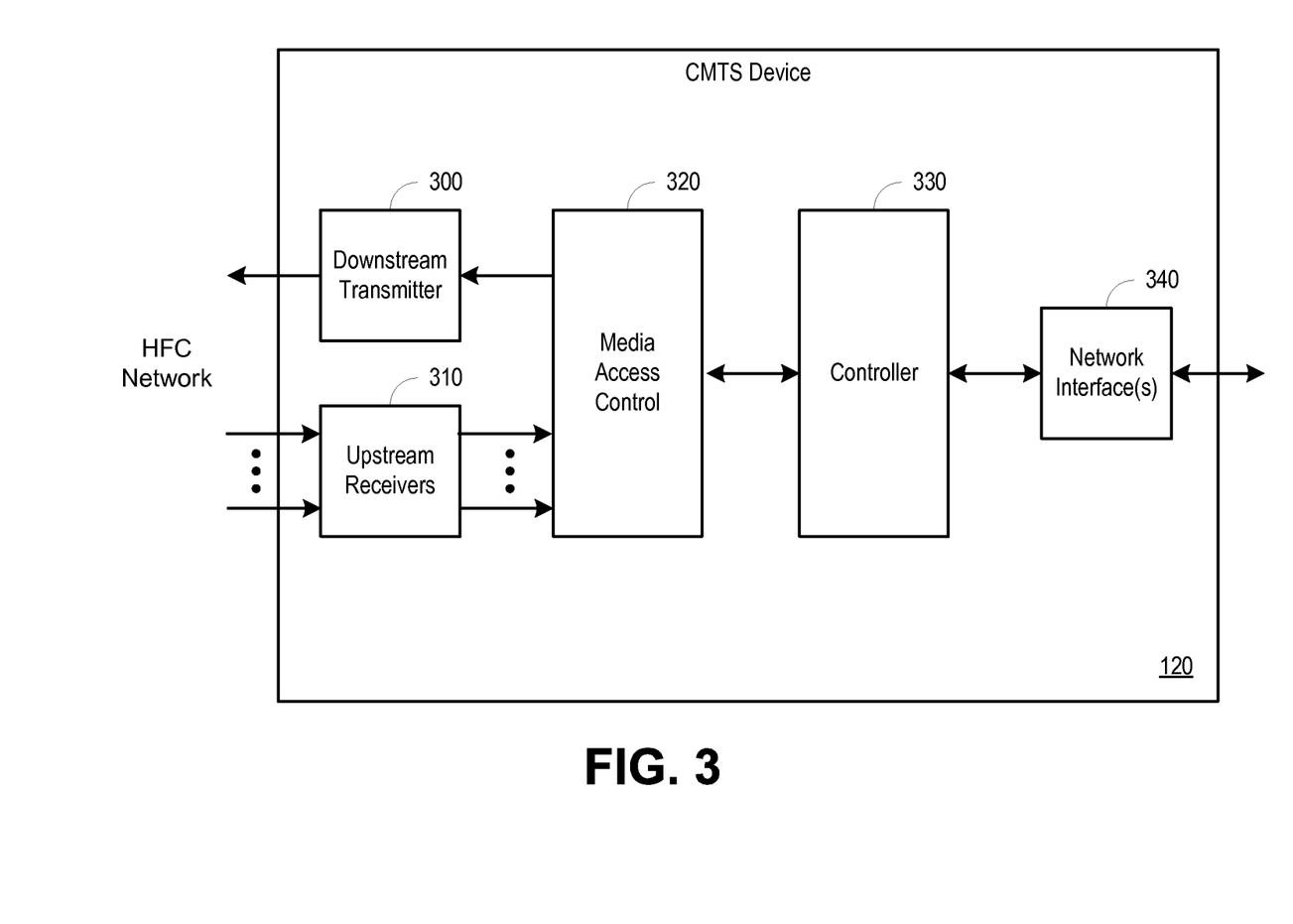
FIG. 3 is a block diagram of a cable modem termination system (CMTS) device capable of receiving data from a CPE device capable of transmitting data on one or more bonded upstream channels.

FIG. 3 is a block diagram illustrating a CMTS device 120 capable of providing a communication system and method from/to wide area network (e.g., WAN 125 of FIG. 1) to/from CPE devices (e.g., CPE devices 110a-d of FIG. 1) through an HFC network (e.g., HFC network 115 of FIG. 1). The CMTS device can include network interfaces 340 to communicate with the wide area network. The controller 330 can provide packet processing and control of the network interface(s) 340, MAC module 320, downstream transmitter 300 and upstream receivers 310. The MAC module 320 can provide bandwidth allocation for downstream/upstream channel(s), process packets from one or more bonded upstream channel(s), QoS and maintenance capabilities. The associated processing and control of CMTS device 120 can be distributed between the MAC module 320 and the controller 330. The downstream transmitter 300 receives packets from MAC module 320 for transmission on the HCF network. The downstream transmitter 300 can include modulator(s), digital to analog convertor(s), frequency translator(s), and analog signal conditioning circuitry. The downstream transmitter 300 can transmit on one or more downstream channels. The CMTS device 120 can include multiple downstream transmitters 300 (not shown). Packets are received from the HFC network by the upstream receivers 310 and forwarded to MAC module 320 for processing. The upstream receivers 310 can receive packets from a CPE device on one or more bonded upstream channels and can include demodulator(s), analog to digital convertor(s) and analog signal conditioning circuitry.

Figure 4:
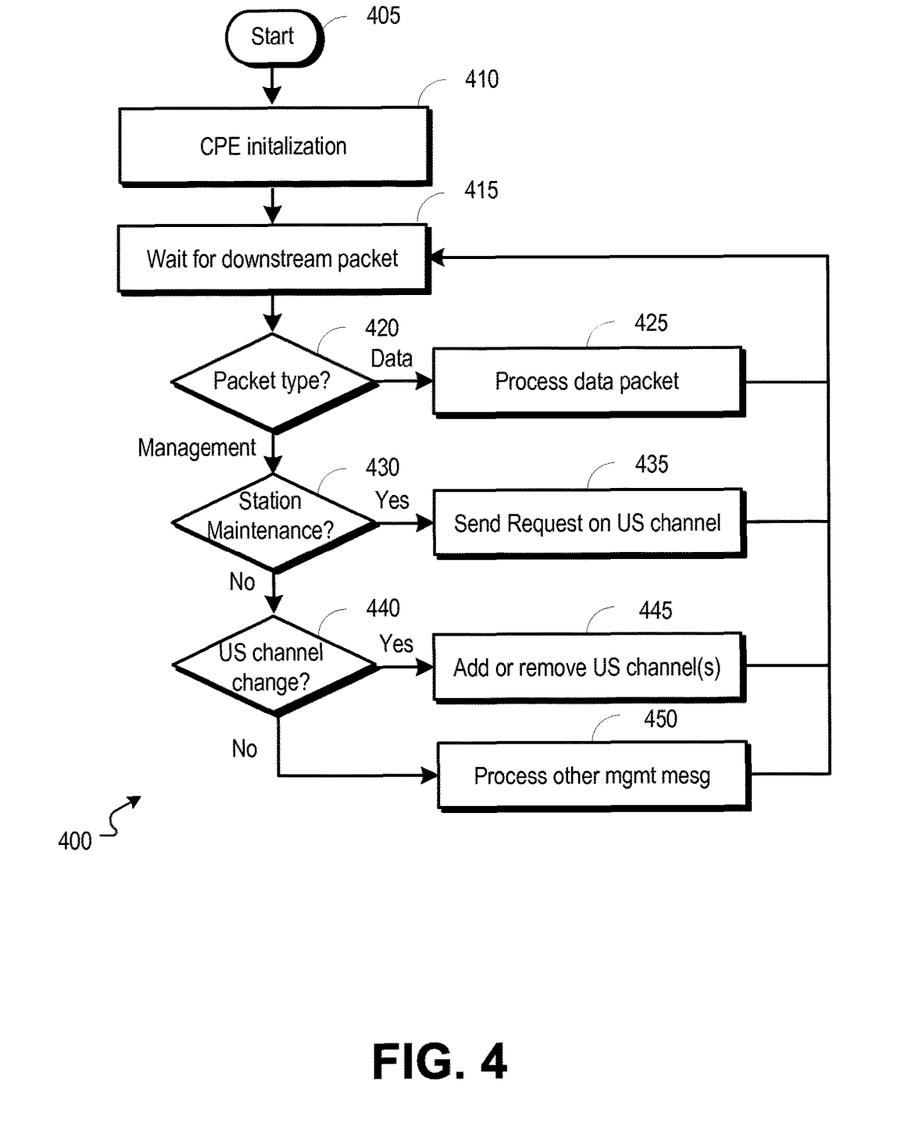
FIG. 4 is a flowchart illustrating an example process for a customer premise equipment (CPE) device receiving downstream packets.

FIG. 4 is a flowchart illustrating an example process 400 of the initialization and packet processing of a CPE device capable of transmitting packets on one or more bonded upstream channels.

At stage 410, a CPE device initially attempts to connect to the CMTS, the CPE device goes through initialization including frequency scanning, ranging, establishing IP connectivity and registration processes with the CMTS. The CPE device performs ranging for one or more bonded upstream channels that it has been configured for.

At stage 415, the CPE device has successfully registered with the CMTS and can provide communication services over the HFC Network. At this stage, the CPE device waits for a downstream packet from the network.

At stage 420, the CPE device has received a unicast or multicast packet intended for the CPE device from the HFC network and can determine if the packet is to be processed and forwarded to a device attached to the CPE or processed internally (e.g., a management packet).

If the packet is data, the process 400 proceeds to stage 425, where the CPE device processes and forwards a packet to an external device through the device interface(s) (e.g., device interface(s) 250 of FIG. 2).

If the packet is determined to be management, the process 400 proceeds to stage 430, where the CPE device determines if the packet to be processed internally by the CPE is a request for station maintenance from the CMTS. If the packet is a station maintenance packet, the process 400 proceeds to stage 435.

At stage 435, the CPE device can process a request for station maintenance specified for a particular upstream channel by the CMTS. Physical or environmental changes can occur in the HFC network effecting communication performance on one or more upstream channels. The CMTS performs periodic station maintenance with the CPE devices (e.g., CPE devices 110a-b in FIG. 1) by allocating an upstream channel opportunity (e.g., time slot) for transmission of upstream channel power level, transmit timing, pre-equalization coefficients and transmit frequency measurements. The CMTS can analyze the station management information from the CPE device and respond with a request to adjust parameters to maintain optimal upstream channel communication performance. Periodic station maintenance is performed on each upstream channel the CPE device is enabled to transmit on.

If the packet is not a station maintenance packet, the process 400 proceeds to stage 440, where the CPE device determines if the packet to be processed internally by the CPE is an upstream channel change request. Upstream channel change requests can be initiated by the CMTS to add or remove upstream channels.

If the packet is an upstream channel change, the process 400 can proceed to stage, 445, where the CPE device processes the upstream channel add or remove CMTS request. While removing an upstream channel reduces the CPE's potential upstream performance on the HFC network, the CMTS will not perform periodic station maintenance on the removed upstream channel. Thereby, the CMTS/CPE device resources and HFC network bandwidth will not be required for the measurement and reporting of parameters. Addition of an upstream channel can result in additional HFC network upstream bandwidth for a CPE device at the expense of the overhead associated with the periodic station maintenance performed by the CMTS on the newly added channel.

If the packet is of another type, implicating different processing, the process 400 can proceed to stage 450, where packets identified to be processed internally by the CPE device by some alternative mechanism are processed.

Figure 5:
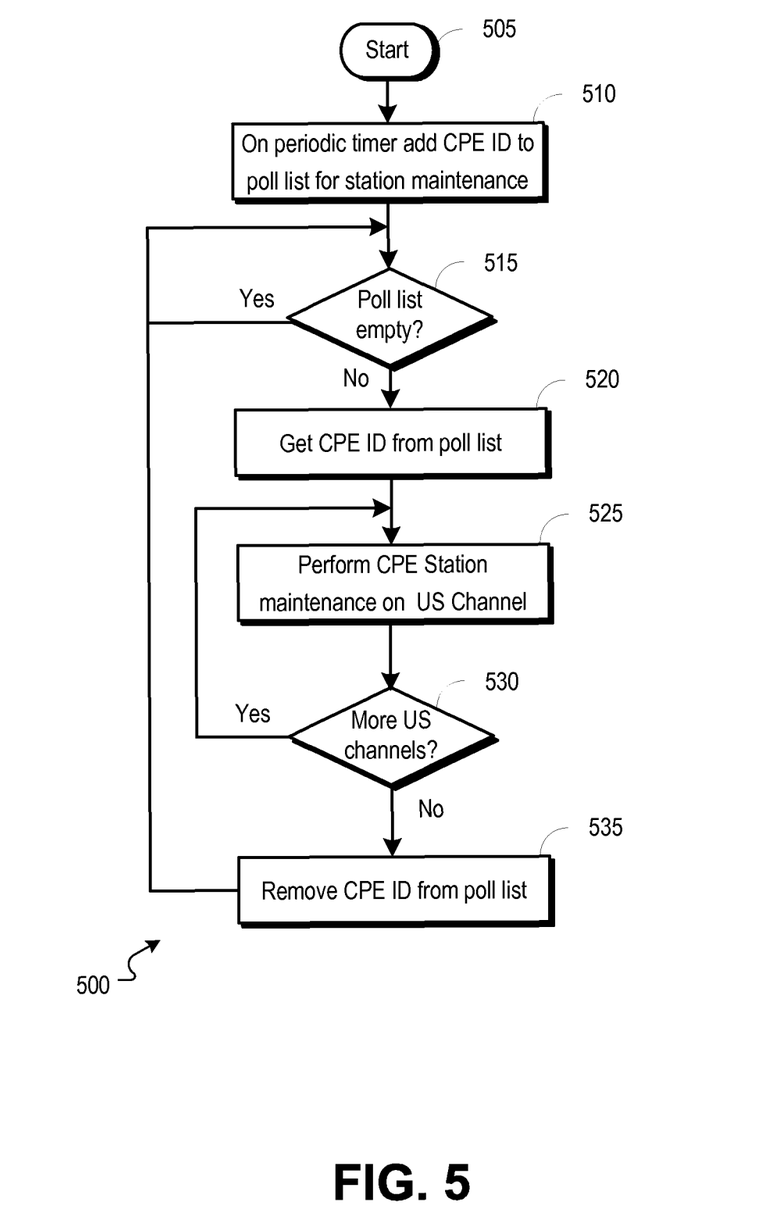
FIG. 5 is a flowchart illustrating an example process for a CMTS performing periodic maintenance on upstream channels with a CPE device.

FIG. 5 is a flowchart illustrating example process 500 for station maintenance processing by a CMTS device capable of receiving packets on one or more bonded upstream channels from a CPE device. At stage 510, the CMTS can add CPE device identification information to a poll list on a periodic basis. The periodic basis represents the polling interval on which station maintenance is performed.

At stage 515, the CMTS determines if a poll list contains CPE devices to perform station maintenance on. If the poll list is empty the CMTS can wait until a CPE device is added to the poll list. Alternatively, if the CMTS determines the poll list is not empty, the process proceeds to stage 520, where the CMTS can obtain the identification information of a CPE device to perform station maintenance operation on.

At stage 525, the CMTS performs station maintenance on a single upstream channel on the CPE device identified in the poll list. The CMTS can perform station maintenance by sending a downstream packet providing the CPE device an upstream channel opportunity (e.g., time slot) for transmission of station management information. The CPE device can respond with upstream channel device power level, transmit timing, pre-equalization coefficients and transmit frequency information. The CMTS can analyze the station management information and send the CPE device upstream channel adjustments.

At stage 530, the CMTS determines if the CPE device has additional upstream channels enabled for communication. For a CPE device that has more than one bonded upstream channel enabled, stage 525 is re-entered to perform station maintenance on the next bonded upstream channel. When station maintenance has been completed on the enabled upstream channel(s) of a CPE device, the process 500 proceeds to stage 535. Thus, a CPE device only capable of transmitting on one upstream channel enters stage 525 once.

At stage 535, CPE device station maintenance has been completed on a CPE device on one or more upstream channels and thereby the CPE device is removed from the list. State 515 is re-entered to determine if station maintenance is required on any additional CPE devices.

Figure 6:
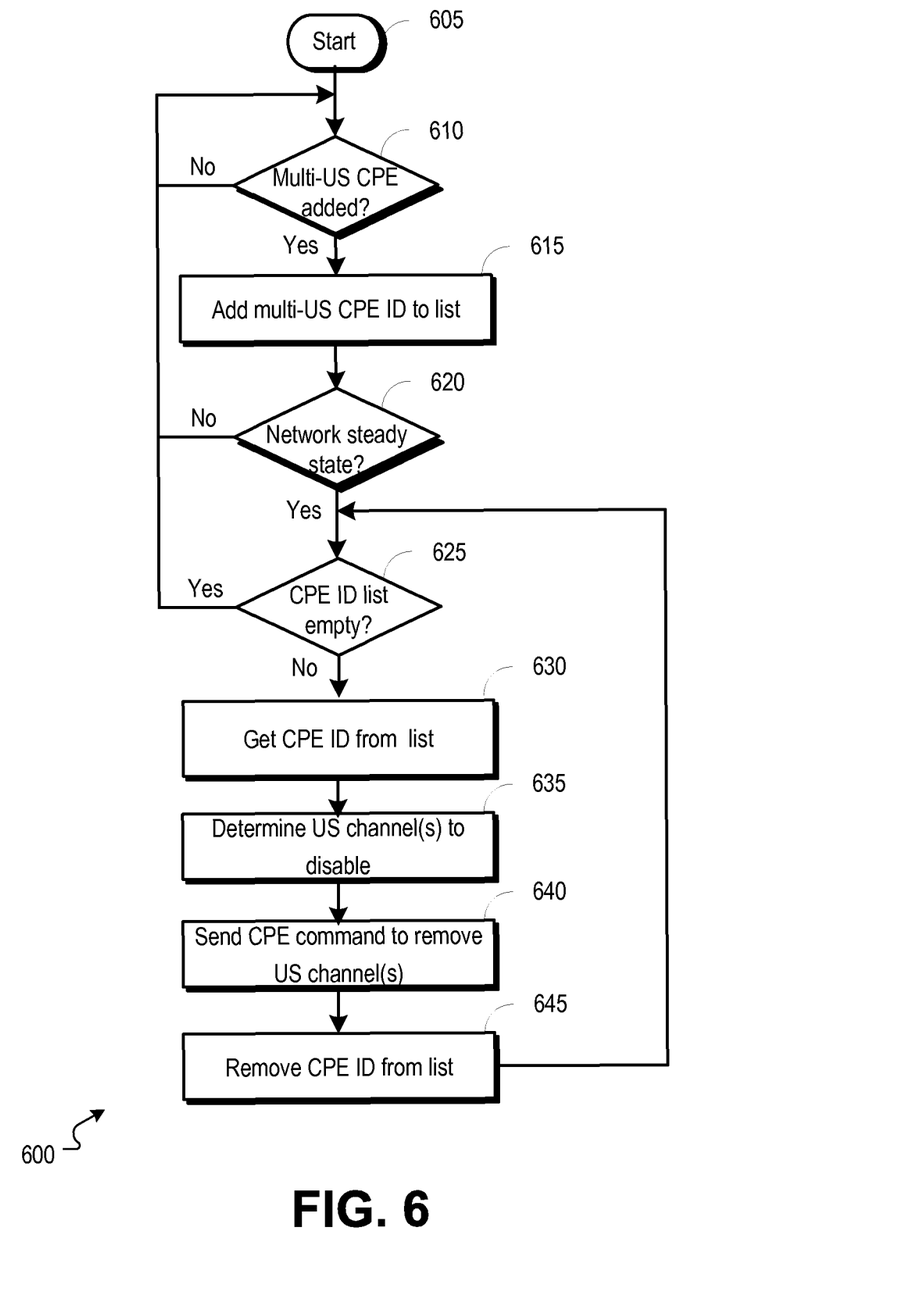
FIG. 6 is a flowchart illustrating an example processes for a CMTS after initialization of CPE devices capable of and provisioned for transmitting on more than one bonded upstream channels.

FIG. 6 is a flowchart illustrating an example CMTS process 600 for transmitting on one or more bonded upstream channels. At stage 610, the CMTS can determine if a newly registered CPE device is operable to communicate on more than one bonded upstream channel.

If the device is operable to communicate on multiple upstream channels, the process 600 proceeds to stage 615, where the CMTS enters the CPE device identification in a list that contains all CPE devices that are capable for communication over more than one bonded upstream channels.

At stage 620, a determination of whether the HFC network is in steady state condition and providing normal communication services is made by the CMTS. For example, if the CMTS were coming out of a power cycle or a reset process the HFC network would typically not be in a steady state since all of the CPE devices can be going through initialization processes (e.g., frequency scanning, ranging, establishing IP connectivity and registration).

If the network is in a steady state, the process proceeds to stage 625, where the CMTS determines if there are remaining CPE devices on the list. If there are remaining devices, then further processing can occur at stage 630. If not, the CMTS enters stage 610 and waits until a CPE device with one or more bonded upstream channels successfully registers with the CMTS on the HFC network.

At stage 630, the CMTS obtains the identification of a CPE device with more than one bonded upstream channel enabled for communication services. At stage 635, that CMTS can identify one or more upstream channels to be inactivated on the CPE device. The CMTS can, but is not limited to, an algorithm of inactivating bonded upstream channels such that active upstream channels are evenly allocated on the HFC network across the CPE devices. Other approaches can include an algorithm based on historical bandwidth or time of day usage, for example.

At stage 640, the CMTS sends a management packet to a CPE device to inactivate one or more bonded upstream channels based on the algorithm at stage 635. At stage 645, the CMTS can remove the CPE device from the list. At this point one or more bonded upstream channels on a CPE device have been inactivated. Thus, station maintenance is not performed on the inactive channels.

Figure 7:
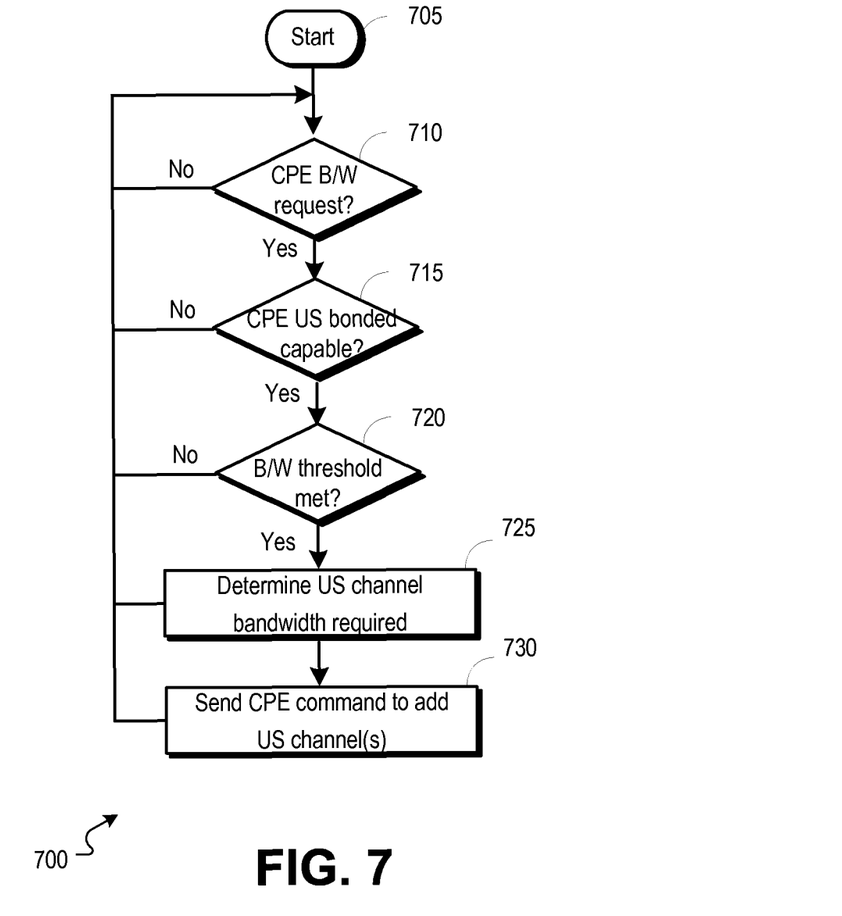
FIG. 7 is a flowchart illustrating an example process for a CMTS performing demand based upstream channel allocation of CPE devices capable of and provisioned for transmitting on more than one bonded upstream channel.

FIG. 7 is a flowchart illustrating example processes 700 of CMTS performing demand based upstream channel allocation of CPE devices capable and provisioned for bonded communication on more than one upstream channel. At stage 710, the CMTS can detect a request for upstream channel bandwidth from a CPE device. If no request is received, the CMTS waits for a request. Alternatively, if a request for upstream channel bandwidth is received from the CPE device, the process 700 proceeds to stage 715.

At stage 715, the CMTS determines if the CPE device is capable of supporting bonded upstream channel communications. Additional upstream channels are not added to a CPE device for which the device is either not capable or not provisioned. If the CPE device is not capable of supporting bonded upstream channel communications, the process returns to stage 710 to wait for another bandwidth request. Alternatively, if the CPE device is cable of supporting bonded upstream channel communications, the process 700 proceeds to stage 720.

At stage 720, the CMTS determines if the CPE device upstream bandwidth requests meet a threshold criterion for increasing bonded upstream channel bandwidth. If the bandwidth request does not meet the threshold criterion for increasing bonded upstream channel bandwidth, the process 700 returns to stage 710 to wait for another CPE bandwidth request. Alternatively, if the bandwidth request does meet the threshold criterion for increasing bonded upstream channel bandwidth, the process 700 proceeds to stage 725.

At stage 725, the CMTS identifies one or more bonded upstream channels for allocation to the CPE device. The CMTS can, but is not limited to, an algorithm of activating upstream channels such that the active upstream channels are evenly allocated on the HFC network across the CPE devices. Other approaches can include an algorithm based on historical bandwidth usage or time of day for example.

At stage 730, the CMTS sends a management packet to a CPE device to activate one or more bonded upstream channels. The identification of the one or more bonded channels to be activated can be based on the algorithm at stage 725.

Figure 8:
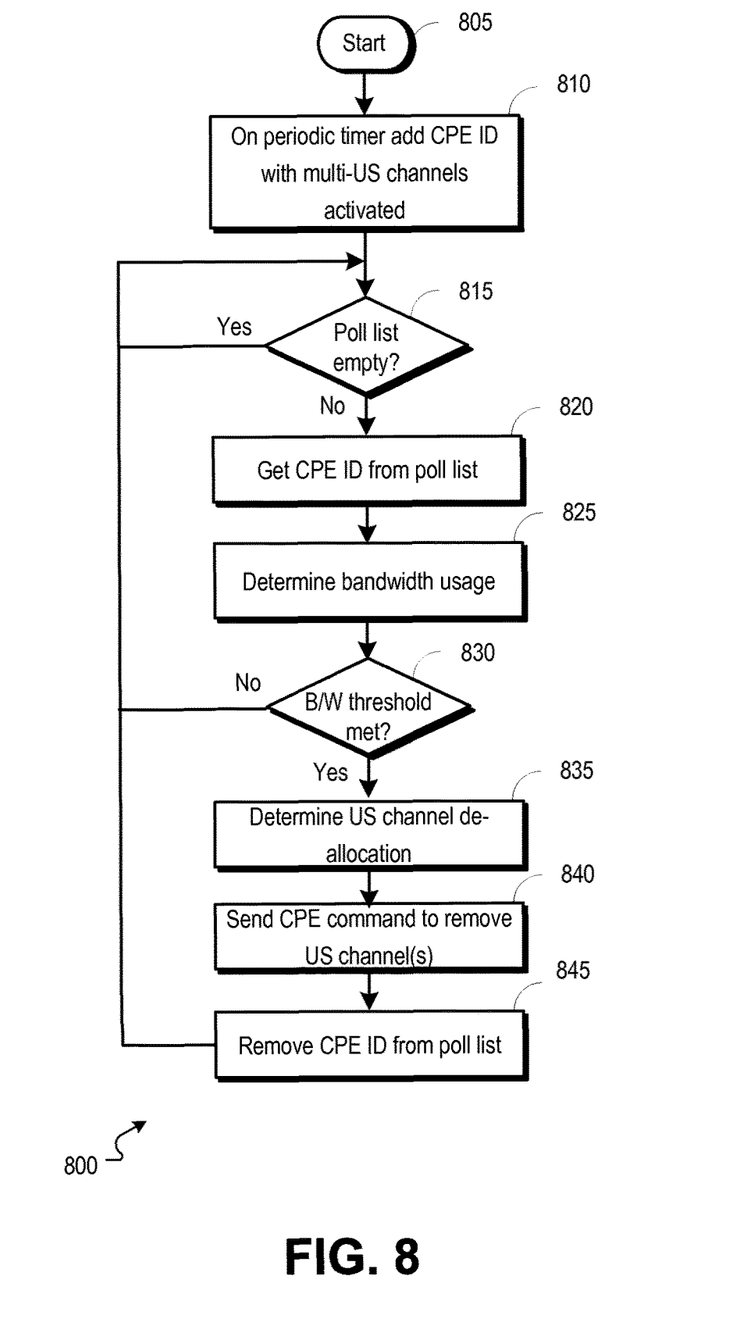
FIG. 8 is a flowchart illustrating an example process for a CMTS performing demand based upstream channel de-allocation of CPE devices capable of and provisioned for transmitting on more than one bonded upstream channel.

FIG. 8 is a flowchart illustrating example processes 800 of CMTS performing demand based upstream channel de-allocation on CPE devices capable and provisioned for bonded communication on more than one upstream channel. At stage 810, the CMTS can periodically put a CPE device capable of and provisioned for bonded upstream communication on a list for bandwidth management. In some implementations, the periodic basis can represents the polling interval that CPE device bandwidth measurement is performed on.

At stage 815, the CMTS determines if the polling list (e.g., list of CPE devices) is empty. If the polling list is empty the CMTS can wait until a CPE device is added to the list. If the list is not empty the CMTS proceeds to stage 820 for additional processing.

At stage 820, the CMTS can obtain the identification of a CPE device capable of and provisioned for bonded upstream communication from the polling list. At stage 825, the CMTS measures the bandwidth on one or more upstream channels of the CPE device.

At stage 830, the CMTS can determine if a bandwidth threshold has been met for de-allocating one or more bonded upstream channels. If the bandwidth threshold has not been met for de-allocating one or more bonded upstream channels, the process 800 returns to stage 815. Alternatively, if the threshold for de-allocating one or more bonded upstream channels has been met, the process 800 proceeds to stage 835.

At stage 835, the CMTS can determine one or more bonded upstream channels for de-allocation from the CPE device. The CMTS can, but is not limited to, an algorithm of de-activating upstream channels such that the active upstream channels are evenly allocated on the HFC network across the CPE devices. Other approaches can include an algorithm based on historical bandwidth or time of day usage for example.

At stage 840, the CMTS can send a management packet to a CPE device to de-activate one or more bonded upstream channels based on the algorithm at stage 835. At stage 845, the CMTS removes the CPE device from the poll list.

Figure 9:
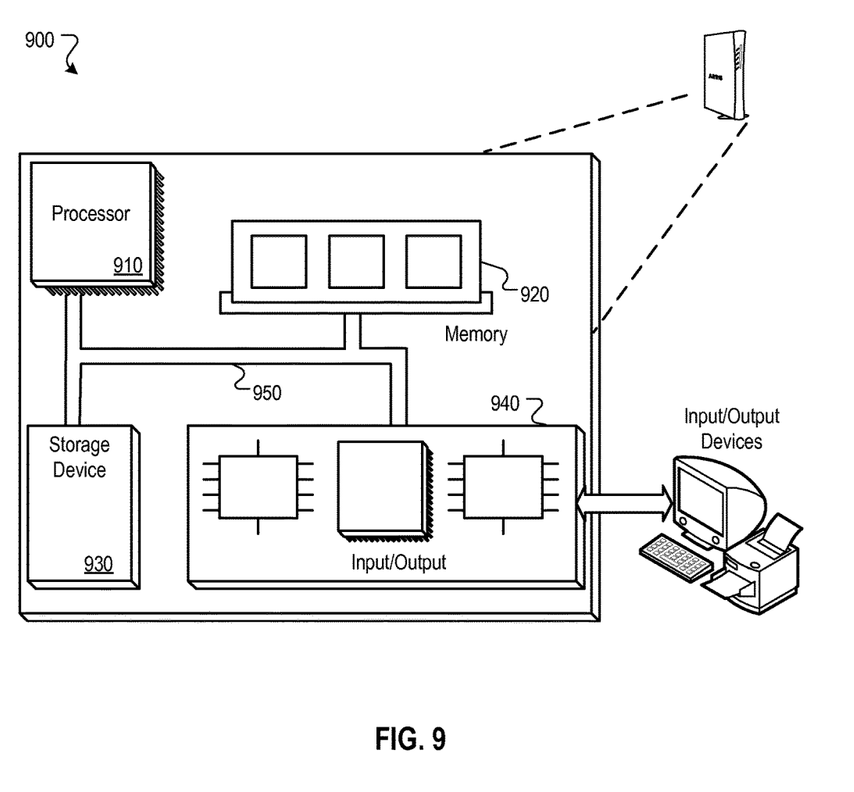
FIG. 9 is a block diagram of an example controller that can be used in a CPE device and/or CMTS.

It should be understood that the initial ranging/registration, station maintenance and channel bonding processes are described in the DOCSIS standards (e.g., DOCSIS 3.0 Physical Layer (PHY) specification and MAC and Upper Layer Protocols Interface (MULPI) specification, each of which are hereby incorporated by reference in their entirety), and are well known in the industry. Thus, this disclosure only describes these processes generally. For a more complete description, reference may be made to the DOCSIS standards FIG. 9 is a block diagram of a controller for a CPE device (e.g., controller 240 of FIG. 2) and for an CMTS device (e.g., controller 330 of FIG. 3). The controller device 900 can include a processor 910, a memory 920, a storage device 930, and an input/output device 940. The scaling (e.g., processor performance, memory size, storage type and input/output devices) of processor 910, memory 920, storage device 930 and input/output device 940 can be different for the CMTS and CPE controllers. Each of the components 910, 920, 930, and 940 can, for example, be interconnected using a system bus 990. The processor 910 is capable of processing instructions for execution within the system 900. In one implementation, the processor 910 is a single-threaded processor. In another implementation, the processor 910 is a multi-threaded processor. The processor 910 is capable of processing instructions stored in the memory 920 or on the storage device 930.

The memory 920 stores information within the device 900. In one implementation, the memory 920 is a computer-readable medium. In one implementation, the memory 920 is a volatile memory unit. In another implementation, the memory 920 is a non-volatile memory unit.

In some implementations, the storage device 930 is capable of providing mass storage for the device 900. In one implementation, the storage device 930 is a computer-readable medium. In various different implementations, the storage device 930 can, for example, include a hard disk device, an optical disk device, flash memory or some other large capacity storage device.

The input/output device 940 provides input/output operations for the device 900. In one implementation, the input/output device 940 can include one or more of a wireless interface, HFC network interface, such as, for example, an IP network interface device, e.g., an Ethernet card, a cellular network interface, a serial communication device, e.g., and RS-232 port, and/or a wireless interface device, e.g., and 802.11 card. In another implementation, the input/output device can include driver devices configured to receive input data and send output data to other input/output devices, as well as sending communications to, and receiving communications from various networks.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus. The tangible program carrier can be a propagated signal or a computer readable medium. The propagated signal is an artificially generated signal, e.g., a machine generated electrical, optical, or electromagnetic signal that is generated to encode information for transmission to suitable receiver apparatus for execution by a computer. The computer readable medium can be a machine readable storage device, a machine readable storage substrate, a memory device, a composition of matter effecting a machine readable propagated signal, or a combination of one or more of them.

The term "system processor" encompasses all apparatus, devices, and machines for processing data, including by way of example a programmable processor, a computer, or multiple processors or computers. The system processor can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors (general microprocessors being transformed into special purpose microprocessor through the application of algorithms described herein), and any one or more processors of any kind of digital computer. Generally, a processor will receive instructions and data from a read only memory, flash memory or a random access memory or all. The elements of a computer typically include a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile communications device, a telephone, a cable modem, a set-top box, a mobile audio or video player, or a game console, to name just a few.

Computer readable media suitable for storing computer program instructions and data include all forms of non volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry.

To provide for interaction with a user, embodiments of the subject matter described in this specification can be operable to interface with a computing device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

What is claimed is:

1. A method for performing demand based upstream channel allocation and de-allocation of a network device comprising:
   detecting a request for upstream channel bandwidth from a network device;
   in response to detecting a request for upstream channel bandwidth from the network device:
      determining that the device supports channel bonding for upstream channel communications;
      based upon the determination that the device supports channel bonding for upstream channel communications, determining whether the device's upstream bandwidth request meets a threshold for increasing bonded upstream channel bandwidth based on a current allocation of bonded upstream channels for the device;

based upon a determination that the device's upstream bandwidth requests meet the threshold for increasing bonded upstream channel bandwidth, identifying a bonded upstream channel for allocation to the network device; and sending a command to the network device to add the bonded upstream channel;

putting identification information associated with the network device on a polling list for bandwidth management;

in response to a selection of the identification information associated with the network device from the polling list:

measuring the bandwidth on one or more upstream channels of the network device;

determining if a bandwidth threshold has been met for de-allocating one or more bonded upstream channels;

if the threshold for de-allocating the one or more bonded upstream channels has been met, determining one or more bonded upstream channels for de-allocation from the network device;

sending a command to the network device to de-activate the one or more bonded upstream channels determined for de-allocation from the network device; and removing the identification information associated with the network device from the polling list.

2. The method of claim 1, wherein identifying a bonded upstream channel for allocation to the network device comprises selecting the bonded upstream channel such that the active upstream channels of one or more network devices on the network are evenly allocated.

3. The method of claim 1, wherein identifying a bonded upstream channel for allocation to the network device comprises selecting the bonded upstream channel based on historical bandwidth usage.

4. The method of claim 1, wherein identifying a bonded upstream channel for allocation to the network device comprises selecting the bonded upstream channel based on time of day.

5. The method of claim 1, wherein the network device comprises a customer premises equipment device.

6. The method of claim 1, wherein the command to the network device comprises a management packet.

* * * * *